United States Patent
Van Vossen et al.

(10) Patent No.: US 7,135,436 B2
(45) Date of Patent: Nov. 14, 2006

(54) SOLID ALGICIDE, PREPARATION AND USAGE IN RECIRCULATING WATER

(75) Inventors: Leonard M. Van Vossen, Justice, IL (US); Dennis D. Cerny, Carol Stream, IL (US)

(73) Assignee: J.F. Daley International, Ltd., St. Louis, MO (US)

( * ) Notice: Subject to any disclaimer, the term of this patent is extended or adjusted under 35 U.S.C. 154(b) by 112 days.

(21) Appl. No.: 10/429,436

(22) Filed: May 5, 2003

(65) Prior Publication Data

US 2004/0222166 A1  Nov. 11, 2004

(51) Int. Cl.
*A01N 25/10* (2006.01)
*A01N 25/34* (2006.01)
*A01N 43/70* (2006.01)

(52) U.S. Cl. .................... 504/155; 504/234
(58) Field of Classification Search ........... 504/155, 504/234
See application file for complete search history.

(56) References Cited

U.S. PATENT DOCUMENTS

| | | | |
|---|---|---|---|
| 3,578,589 A | 5/1971 | Hwa et al. |
| 3,594,469 A | 7/1971 | Whitehead et al. |
| 3,634,584 A | 1/1972 | Poole |
| 4,303,642 A | 12/1981 | Kangas |
| 4,343,789 A | 8/1982 | Kawata et al. |
| 4,351,825 A | 9/1982 | Sothmann et al. |
| 4,368,185 A | 1/1983 | Mizuno et al. |
| 4,500,338 A | 2/1985 | Young et al. |
| 4,629,621 A | 12/1986 | Snipes |
| 4,652,392 A | 3/1987 | Baginski et al. |
| 4,670,166 A | 6/1987 | McDougall et al. |
| 4,673,527 A | 6/1987 | Goudy, Jr. et al. |
| 4,690,824 A | 9/1987 | Powell et al. |
| 4,738,897 A | 4/1988 | McDougall et al. |
| 4,744,976 A | 5/1988 | Snipes |
| 4,764,378 A | 8/1988 | Keith et al. |
| 4,774,074 A | 9/1988 | Snipes |
| 4,784,855 A | 11/1988 | Yamashita et al. |
| 4,806,337 A | 2/1989 | Snipes et al. |
| 4,891,423 A | 1/1990 | Stockel |
| 5,128,045 A | 7/1992 | Parsons et al. |
| 5,244,668 A | 9/1993 | Snipes |
| 5,252,561 A | 10/1993 | Hornykiewytsch et al. |
| 5,284,590 A | 2/1994 | Kohlhofer et al. |

(Continued)

FOREIGN PATENT DOCUMENTS

CA          987588          4/1976

(Continued)

OTHER PUBLICATIONS

Handbook entitled "The Polyglycol Handbook", The Dow Chemical Company, 1968, pp. 6-11.

*Primary Examiner*—S. Mark Clardy
(74) *Attorney, Agent, or Firm*—Olson & Hierl, Ltd.

(57) ABSTRACT

Technology is provided for treating recirculating water in a system to control algae in, for example, a cooling water, an evaporative condenser, a heat exchanger, or a decorative fountain. A solid composition comprising terbuthylazine dispersed in polyethylene glycol is contacted with recirculating water. The polyethylene glycol slowly dissolves, and the terbuthylazine is delivered into the water. The composition is preferably prepared by dispersing the terbuthylazine in molten polyethylene glycol followed by molding and solidifying. A preferred polyethylene glycol has an average molecular weight of about 8,000. The system can accomplish addition of terbuthylazine to recirculated water without the need for a dosing pump and without exposure of operating personnel to terbuthylazine.

37 Claims, 2 Drawing Sheets

U.S. PATENT DOCUMENTS

Figure 1:
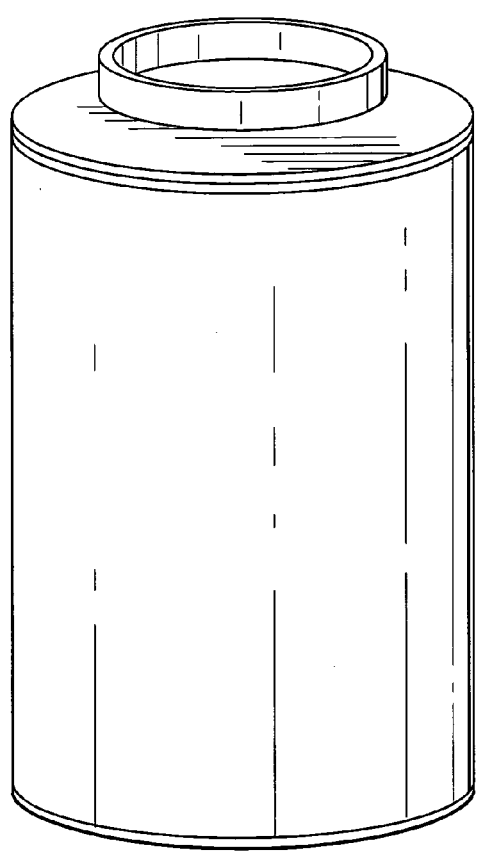

| | | |
|---|---|---|
| 5,441,742 A | 8/1995 | Autant et al. |
| 5,441,923 A * | 8/1995 | Tocker .................... 504/125 |
| 5,444,113 A | 8/1995 | Sinclair et al. |
| 5,562,850 A | 10/1996 | Woo et al. |
| 5,614,578 A | 3/1997 | Dong et al. |
| 5,618,560 A | 4/1997 | Bar-Shalom et al. |
| 5,654,198 A | 8/1997 | Carrier et al. |
| 5,702,684 A | 12/1997 | McCoy et al. |
| 5,717,023 A | 2/1998 | Batty et al. |
| 5,760,118 A | 6/1998 | Sinclair et al. |
| 5,773,030 A | 6/1998 | Nastke et al. |
| 5,788,991 A | 8/1998 | Nastke et al. |
| 5,840,338 A | 11/1998 | Roos et al. |
| 5,889,130 A | 3/1999 | Worley et al. |
| 6,040,406 A | 3/2000 | Carrier et al. |
| 6,099,755 A | 8/2000 | Kessler et al. |
| 6,129,782 A | 10/2000 | Brodie et al. |
| 6,150,432 A | 11/2000 | Jones et al. |
| 6,241,994 B1 | 6/2001 | Lee et al. |
| 6,281,169 B1 | 8/2001 | Yeoman et al. |
| 6,339,043 B1 | 1/2002 | Kirby et al. |
| 2002/0048601 A1 | 4/2002 | Beckett et al. |

FOREIGN PATENT DOCUMENTS

| | | |
|---|---|---|
| DE | 1 617 362 | 3/1971 |
| DE | 25 46 577 | 4/1977 |
| DE | 25 49 740 | 5/1977 |
| EP | 0 285 209 A2 | 10/1988 |
| EP | 0 328 145 A2 | 8/1989 |
| EP | 1 142 477 A2 | 10/2001 |
| GB | 2 160 100 A | 6/1985 |
| WO | WO 01/36290 A1 | 5/2001 |
| WO | WO 01/95939 A1 | 12/2001 |

* cited by examiner

SOLID ALGICIDE, PREPARATION AND USAGE IN RECIRCULATING WATER

FIELD OF THE INVENTION

This invention relates to treating recirculated water used in apparatus, such as cooling towers, evaporative condensers, heat exchangers, ornamental fountains, and the like, to control algae; to an algicidal composition useful in such treating; and to methods for preparing the composition and for utilizing the composition for water treatment.

BACKGROUND OF THE INVENTION

The addition of algicide to recirculated water, such as used in cooling towers and the like, to control algae growth and development is desirable, even necessary, because algae growing in such water impairs the utility of the water for cooling purposes and results in contamination and fouling of surface portions of equipment contacted therewith.

Although various chemicals and recirculated water treating procedures have been previously used, terbuthylazine (which is 2-(tert-butylamino)-4-chloro-6-(ethylamino)-s-triazine) has been found to be effective for controlling algae growth. Typically, a powdered or aqueous terbuthylazine-containing treating composition can be added to the cooling tower water on a batch (periodic) or continuous basis. Batch addition to recirculated cooling tower water may be undesirable because the treatment may be effective only for a brief initial period or because the terbuthylazine is not always present at desirable levels. For example, after batch addition, the amount of active agent present can decline for a variety of reasons, including deterioration, addition of replacement water to compensate for system water loss, and the like. With a decrease in the effective amount of active agent, an increase in algae growth in cooling tower water can occur, for example. On the other hand, the continuous addition of powdered or aqueous terbuthylazine to cooling tower water may be undesirable because of the costs of equipment (such as metering pumps and the like) and of maintenance.

Furthermore, the U.S. Environmental Protection Agency has taken the position that exposure of personnel to terbuthylazine, such as might occur with a prior art procedure of adding powdered or aqueous terbuthylazine formulations to cooling water, should be avoided because of potential adverse effects.

There is therefore a need for improved technology that enables one to treat the recirculated water of a cooling tower or the like with terbuthylazine in a relatively simple, cost effective, safe and efficient manner.

SUMMARY OF THE INVENTION

This invention in one aspect is directed to a solid, water soluble, user safe recirculating water treating composition comprised of terbuthylazine and polyethylene glycol.

This invention in another aspect is directed to improved methods for treating water, especially water that is recirculated, such as the water that occurs in a cooling tower or the like, with the inventive treating composition to control (including prevent, or minimize, growth and development of) algae.

This invention in yet another aspect is directed to methods for preparing the inventive treating composition.

The inventive methods for treating recirculated water (including water that is to be recirculated) are simple, safe, reliable and effective yet do not require any auxiliary powered metering equipment, such as metering pumps, timers, and the like, for introducing the composition. In practicing the treating methods, a composition is introduced into water resulting in the relatively slow dissolution of the composition in water and the relatively slow release of terbuthylazine into the water. The methods accomplish the introduction of, and can regulate the concentration level of, terbuthylazine in water that is susceptible to algae contamination and growth. The methods achieve terbuthylazine introduction into water in a uniform and effective manner over an extended time period. The methods can be employed with the recirculated waters of, for example, a cooling water, an evaporative condenser, a heat exchanger, a decorative (ornamental) fountain, or the like.

The inventive treating composition is characterized by excellent stability, long term storage capability, and negligible atmospheric release of terbuthylazine. A composition can be prepared, if desired, to have, when contacted with water under controlled or predictable conditions, a predetermined rate of release of terbuthylazine into the water.

The inventive methods of treating composition preparation and use are simple, safe, reliable and effective.

The treating composition, the treating methods, and the method of preparing the composition are safe and effective, and avoid or minimize exposure of personnel to terbuthylazine.

The known algicide employed in the practice of the present invention, terbuthylazine (2-(tert-butylamino)-4-chloro-6-(ethylamino)-s-triazine), is effective for control of algae in recirculated water, but, as reflected in U.S. Environmental Protection Agency Rules, can present exposure hazards to personnel. These hazards are avoided by the present invention.

The inventive treating composition is solid, homogeneous and relatively slowly water soluble under ambient conditions. The composition typically and preferably comprises on a 100 weight percent basis from about 1 to about 55 weight percent of terbuthylazine, and, correspondingly, from about 45 to 99 weight percent of a water soluble polymer comprised of polyethylene glycol. Such a polymer is preferably a solid at ambient temperatures but is a liquid at some temperature above about 100° F. (38° C.). Larger and smaller amounts of terbuthylazine, and, correspondingly, smaller and larger amounts of polyethylene glycol, can be present in a composition, if desired, as can minor amounts of inert materials. Also, polyethylene glycol that is a liquid at some lower temperature can be utilized, but preferably the polyethylene glycol should be a solid at ambient temperatures and preferably also at temperatures above ambient where, for example, in some applications, the contacting water may itself be above an ambient temperature.

A treating composition can be prepared by various procedures. In general, during composition preparation, the terbuthylazine is preferably uniformly dispersed in the polyethylene glycol polymer preferably while the polyethylene glycol is generally at least partially in a liquid state. In one preparation procedure, the terbuthylazine and the polymer, preferably as a premixed particulate composition, are extruded to produce a uniform dispersion of the terbuthylazine in the polymer, and the extrudate is preferably molded before being cooled to a solid.

In a presently most preferred preparation procedure, the terbuthylazine, preferably in a powdered state, is admixed with the polymer while the polymer is in a molten condition, thereby producing a uniform dispersion, followed by molding and cooling to solidify.

To control algae in accord with the invention, a treating composition is contacted with recirculated water (including water to be recirculated). Resultingly, water-exposed surface portions of the composition dissolve and the terbuthylazine is gradually released into the contacting water. The resulting water is admixed with the body of the recirculated water. Various systems for contacting the composition with water, and for releasing of the terbuthylazine into recirculated water, can be employed, as those skilled in the art will readily appreciate. The system of choice in any given situation is influenced by the application involved and the available equipment.

Various other objects, features, advantages, purposes, aims, embodiments and the like will be apparent to those skilled in the art from the present disclosure taken with the accompanying drawings and the appended claims.

BRIEF DESCRIPTION OF THE DRAWINGS

FIG. 1 is a perspective view illustrating the configuration of a wide-mouth, preferably gallon-size, cross-sectionally generally circular plastic container employed as one illustrative mold for a solid composition of the invention;

FIG. 2 is a perspective view illustrating the configuration of a cross-sectionally generally rectangular, open plastic tray employed as a second illustrative mold for a solid molded composition of the invention;

FIG. 3 is a perspective view illustrating the configuration of a cross-sectionally generally circular plastic container employed as a third illustrative mold for a solid molded composition of the invention, the container having the general configuration of a conical section;

FIG. 4 is a perspective view illustrating the configuration of a fourth illustrative plastic container mold for a solid molded composition of the invention, the container having a generally cylindrical configuration; and FIG. 5 is a diagrammatic view of an evaporative condenser which is operated with recirculating water treated with a composition of the invention.

DETAILED DESCRIPTION (a) Starting Materials (1) Polyethylene Glycol Polymer

The polyethylene glycol polymers employed in the practice of the present invention are water soluble polymers usually comprised of polymerized ethylene oxide. Such polymers are commercially available, for example, from the Dow Chemical Company of Midland, Mich. Such polymers, as selected for use in the practice of the present invention, are solids at ambient conditions, but preferably are meltable without decomposition to produce liquids at temperatures that are preferably above about 100° F. (38° C.). More preferably, such a polymer is a stable liquid at a temperature in the range from about 140° F. (60° C.) through at least about 200° F. (93° C.), and is substantially completely melted at a temperature in such range. Water soluble polyethylene glycol polymers having higher and lower solidification (liquification) temperatures can be employed, if desired. Mixtures of such polymers may be employed, if desired.

A presently preferred class of polyethylene glycol polymers has members with an average molecular weight in the range of from about 1450 to about 10,000 and, correspondingly, a melting (or freezing) point in the range of about 100° to about 200° F., although other polyethylene glycols can be employed, if desired. One presently most preferred polyethylene glycol polymer has an average molecular weight of about 8000 and a melting point of about 140° F. The melting point of a polyethylene glycol polymer is characteristically directly proportional to its molecular weight and structure.

Chemically modified polyethylene glycol polymers may be employed, if desired, particularly when an objective is to achieve a treating composition having a particular set of characteristics, such as melting point and dissolution rate in water. For example, small amounts of reacted propylene oxide and/or butylene oxide may be present in a polyethylene glycol polymer along with reacted ethylene oxide. Polymer chains of ethylene oxide may be, if desired, terminated by primary hydroxyl groups while propylene oxide and butylene oxide containing polymer chains may be, if desired, terminated by secondary hydroxyl groups, for example. The molecular weight of a polyethylene glycol, and the incorporating of propylene oxide or butylene oxide into a polymer mainly comprised of ethylene oxide (i.e., a polyethylene glycol) can result in polymer products which are solids at ambient (room) temperatures and which have differing room temperature hardness characteristics. Also, as those skilled in the art will appreciate, polymeric or monomeric compounds that contain an active hydrogen atom can be reacted with alkylene oxides, such as ethylene oxide, to change the water solubility characteristics of the product polymer. For example, minor amounts of amines can be reacted with ethylene oxide to increase the water solubility of the product polymer. Usually, polyethylene glycol polymers employed in the practice of this invention contain at least about 50 weight percent, and preferably at least about 70 weight percent, on a 100 weight percent polymer basis of incorporated ethylene oxide.

(2) Terbuthylazine

Terbuthylazine is commercially available, for example, from Bio-Lab, Inc. of Decatur, Ga. In preparing a treating composition, it is presently preferred to employ a terbuthylazine which is initially in a solid, powdered form that contains at least about 90 weight percent terbuthylazine with the balance up to 100 weight percent being inert carriers.

For example, the powdered formulation available from Bio-Lab, Inc. under the trade designation "Bellacide 320" can be employed as a powdered starting material; this formulation reportedly contains 96 weight percent terbuthylazine and 4 weight percent inert carriers.

So far as now known, various common inert carriers may be compounded with a starting powdered terbuthylazine. When dispersed in polyethylene glycol polymer along with the terbuthylazine, inert carriers do not appreciably interfere with a product treating composition or with the dispersability or dissolution of the terbuthylazine from a treating composition when the composition is contacted with water, and also do not interfere with the water solubility characteristics of the produced molded, solid product treating composition.

(b) Treating Composition and Method of Preparation

Compositions useful in the practice of the invention are prepared by dispersing the terbuthylazine in the polymer while the polymer is preferably in a liquid state. While a typical preferred composition comprises from about 1 to about 55 weight percent terbuthylazine and about 45 to about 99 weight percent of water soluble polyethylene glycol polymer on a 100 weight percent basis, as indicated above, more preferably a composition comprises from about 10 to about 40 weight percent terbuthylazine and from about 60 to about 90 weight percent polyethylene glycol polymer on a 100 weight percent basis. Minor amounts, perhaps up to about 10 weight percent on a total composition weight basis, of inert carriers or additives can be present, such as, for example, the inert carriers that may be present in a starting powdered formulation of terbuthylazine.

Various techniques for dispersing terbuthylazine in the polyethylene glycol can be utilized. For example, in one preparation procedure, the terbuthylazine and the polymer, preferably each in a particulate initial form, can be charged to and extruded under pressure from a conventional screw type extruder to produce a uniform dispersion of the terbuthylazine in the polymer. Preferably, the polymer is initially in a relatively finely divided, particulate solid state, and the terbuthylazine is initially in a dried, powdered form, and these components are preferably initially uniformly admixed together, before the resulting admixture is charged to the extruder. During extrusion, in the extrudate, the polymer is in a consolidated, viscous condition with the terbuthylazine distributed therethrough. The extrudate is cooled and may preferably be molded using a conventional molding procedure for thermoplastic resins and then the molded product(s) are cooled to solidify. The conditions of extrusion, particularly temperature and pressure, are selected and influenced by the melting point and viscosity of the particular polyethylene glycol polymer being used.

In another and presently most preferred composition preparation procedure, the terbuthylazine in a dried, powdered form is admixed with a polyethylene glycol polymer most preferably after the polymer has been heated to an extent sufficient to place it in a substantially completely melted or molten condition. The product mixture comprises a substantially uniform dispersion or solution of the terbuthylazine in the polymer. The mixture in its heated, liquid state is transferred to molds or other receiving vessels by pouring or the like after which the mixture is allowed to cool to ambient conditions and solidify. Preferably, the polymer is initially substantially completely melted, and preferably, as the terbuthylazine is added thereto, the mixture is agitated while being maintained at a temperature that is above the melting point of the polymer. When a presently most preferred type of polyethylene glycol polymer (above indicated) is employed, a presently preferred mixing temperature is in the range of from about 140° to about 200° F.

Preferably, the resulting molded bodies comprising a treating composition have shapes which adapt them, or facilitate them, for use in a desired or selected water treating procedure and associated equipment.

Particularly when the terbuthylazine is uniformly distributed through a matrix of the polyethylene glycol in a molded product composition, a composition is generally characterized by the feature that, when contacted with water, the terbuthylazine in the composition is released and delivered into the water preferably at a relatively slow and uniform release rate as the polyethylene glycol slowly dissloves.

(c) Method of Use

A solid treating composition provided by the invention is contacted with recirculated water or process water subject to contamination by algae. The so contacted solid composition slowly dissolves to release the terbuthylazine into the water. The contacting can be variously accomplished and the water resulting from the contacting contains terbuthylazine. This resulting water is added to, or admixed with, the body of water being recirculated or is directly used as recirculated water in a system.

Preferably, water-exposed surface portions of the polyethylene glycol polymer that comprises the matrix of a treating composition undergo a relatively slow dissolution. Typically, for a given treating composition, the rate of dissolution is believed to be generally constant for given conditions and to be substantially pH independent.

In accord with the invention, a solid treating composition that is dissolved as above described functions to control algae in recirculated water (including water that is to be recirculated). Based on available information, it appears that the control of algae by water that contains terbuthylazine in accord with the practice of this invention is achieved by (a) killing algae contacted therewith, (b) preventing or interfering with the growth and development of algae contacted therewith, and/or (c) both (a) and (b).

A treating composition is contacted with water either continuously (now preferred) or discontinuously. As those skilled in the art will appreciate, various water contacting procedures can be employed, including spraying of water at various pressures and temperatures against a composition, flowing water over surface portions of a composition, immersing a composition into a well or bath or reservoir of water, and the like. For example, a molded solid treating composition can be immersed into a sump of recirculated water or positioned in a stream of make-up water, or the like. As a result, typically surface portions of the treating composition are dissolved and the terbuthylazine is gradually released and delivered directly into the water. As released and delivered into the water, the terbuthylazine is preferably immediately dissolved in the water.

Since the solubility of terbuthylazine in water is relatively low (believed to be about 5 ppm at 20° C., for example), it is presently preferred that, for a particular water treatment, the rate of dissolution of a given treating composition in the water be slower than or equal to the dissolution rate of the terbuthylazine in the water at the temperature, pressure and other conditions involved. For a given composition wherein the terbuthylazine is uniformly dispersed, and for generally constant conditions of composition contacting with water, the terbuthylazine is released into and dissolved in the contacting water at a generally constant and pH independent rate. The amount and the rate of terbuthylazine released is determined by various factors, such as the weight percent of terbuthylazine present in a composition, the molecular weight of the polyethylene glycol polymer used, the dissolution rate of the polyethylene glycol polymer, and the like.

For well-known environmental, cost, availability, conservation, and operational reasons, water in a system may be recirculated or reused. Because of the particular conditions involved in many systems, recirculated or reused water can experience algae infestation which needs to be controlled. Typically, fresh or other process water must be added gradually or periodically to recirculated water to maintain a desired quantity or volume of recirculated water in a system. Typically, in the practice of the present inventive method, algae control is achieved. At any given time, continuously or discontinuously, water containing terbuthylazine is typically mixed with a body of recirculated water in a system. Resultingly, water-exposed surface portions of a solid composition are dissolved usually relatively slowly by the contacting water, and thereby a release of the terbuthylazine into the recirculated water is achieved. The resulting water portion containing the terbuthylazine is subsequently either immediately, or through controlled subsequent (or delayed) release, admixed with the main body of recirculated water of the system.

The recirculated water that is treated with the terbuthylazine can be part of, or employed in, one of the various systems that employ recirculated water, such as, for example, the cooling water of an evaporative condenser, a heat exchanger, a cooling tower, or the water of a decorative (ornamental) fountain.

The term "evaporative condenser" has conventional reference to a device in which vapor is condensed within tubes that are cooled by the evaporation of water flowing over the outside of the tubes.

The term "heat exchanger" has conventional reference to a device, including an automobile radiator or the like, that transfers heat from one fluid to another or from a fluid into the environment.

The term "cooling tower" has conventional reference to a tower-like device in which atmospheric air circulates and cools warm water, generally by direct contact (evaporation). The water used may be circulated and recirculated in the device, and water may be lost from the device particularly by evaporation. To maintain an effective or selected minimal quantity of water in the device, "make-up" or "added" water may be introduced into the device.

Various systems, such as evaporative condensers, heat exchangers, and cooling towers, that use recirculated water or process water subject to algae infestation are known and used commercially. The composition and usage methodology of the invention can be utilized, if desired, with various water-using systems including cooling ponds, spray ponds, evaporators, condensers, storage and transfer systems, receivers, liquid phase heat exchangers, various storage tanks and aqueous beds, and the like.

In accord with the method of use of the invention, a solid treating composition is introduced directly or indirectly into the recirculated water of a device or system for purposes of controlling algae. Various techniques of addition can be employed. Conveniently, a solid composition is immersed in or added to system water. Preferably, the composition is in the form of a molded body which may or may not be in a container or the like up to and including the time of usage. The location of immersion or addition can vary, and can be, for example, a sump or well, a fresh water reservoir, spray, or stream, or the like, as desired.

Alternatively, if desired, a solid composition can be placed in a suitable container having apertured wall portions, or an open side, through which process water can enter and exit and thereby slowly dissolve the composition. The container holding a solid treating composition can be associated with a particular location in a device or system by means of conventional fastening means which is preferably demountable or dissociatable relative to the device. The fastening means used can be conventional, such as, for example, mechanical fasteners, adhesives, or magnetic means.

Alternatively, if desired, a solid composition can be located in an incorporated or associated chamber of a spray assembly, such as a spray assembly that can be mounted to a wall portion above or adjacent to a water holder (a reservoir or sump) from which water is drawn for recirculation, or the like. Water charged to the spray assembly can wash over the solid composition and gradually dissolve same, and the resulting effluent can be, for example, added directly to recirculation water by drainage or the like, or indirectly by first being held in a reservoir as make-up water that is charged to recirculated water through a water-level regulating float valve or the like. The spray assembly can, if desired, be intermittently operated, driven by a battery, and/or associated with a timer and solenoid valve means.

By the practice of the inventive process for algae control, one can accomplish continuous or discontinuous addition of, and dissolution of, terbuthylazine into or in recirculating water of a pre-chosen system without the need for a dosing pump (or other mechanical means for dose metering) and without exposure of operating personnel to terbuthylazine. Various modes of practice can be employed.

If desired, and for example, in one mode of practice, the process is carried out so that the relationship between the variables (which may or may not be actually known or measured or controlled individually), such as the solid composition, the water, the approximate dissolving rate of the composition, the manner of admixing of the resulting terbuthylazine-containing water with water recirculated in a cooling tower or the like, are such that the concentration of terbuthylazine is maintained generally at a level in the recirculated water that is at least sufficient to control algae. Even relatively low concentrations of terbuthylazine in water can be effective for purposes of achieving control of algae therein. A concentration level sufficient to achieve control of algae may be different for various types of equipment, systems, environmental conditions and types of algae infestations, threats of infestations, or the like. Because of the variables involved, no specific minimum concentration level sufficient for algae control can be stated for all situations.

However, a maintenance concentration (that is, a minimum concentration of terbuthylazine that seems to be usually sufficient to control algae in a recirculated water system) is believed to be typically and illustratively in the range of about 1 to about 3 ppm, although larger and smaller minimum maintenance concentration levels of terbuthylazine in particular recirculated water can vary widely. Certainly larger and smaller concentrations may be used without departing from the spirit and scope of the invention. Those skilled in the art will appreciate that concentrations below or above a value in the illustrative maintenance range may give adequate algae control in some situations depending upon variables, such as the strains of algae present, equipment type or operating conditions, such as temperature, the season of the year, and the like. Experience with a given system may demonstrate a minimum maintenance concentration that is deemed to be sufficient for that system. In general, as those skilled in the art will appreciate, in order to achieve a desired or selected maintenance level in the recirculated water, it may be necessary to know or measure or consider such factors such as, for example, the associated operating temperatures, half-life, volume, evaporation rate and windage loss of the recirculated water in a system or operating environment and the like.

In general, terbuthylazine is sometimes considered to be rather slow to control and to remove algae from a system perhaps because it inhibits algae growth, and, therefore, its action in water being recirculated typically does not result in, for example, the rapid fouling or defouling of particular equipment locations, such as, for example, the distribution deck orifices or the heat exchange surfaces of a cooling tower.

Those skilled in the art will appreciate that other control agents, such as, for example, chlorine and/or bromine may be, if desired, dosed to a recirculating water system concurrently with terbuthylazine. Sometimes, as those skilled in the art will appreciate, incorporating such other control agents with terbuthylazine in a composition of the invention can be effectuated. Sometimes, as those skilled in the art will also appreciate, it may, for example, be efficacious to incorporate into water being treated in accordance with the invention one or more surface active agents. Surface active agents (surfactants) may enhance penetration of terbuthylazine-containing water into algae or into equipment surfaces that may be subject to contamination by algae. Alternatively, if desired and for example, surface active agents may be incorporated in small amounts into a treating composition during solid composition preparation. Various surfactants, for example, can be employed, such as those commonly employed in biodegradable detergents and the like, as those skilled in the art will readily appreciate. Examples include sodium dodecylbenzene sulfonate, cocoa DEA amide, non-ionic ethyoxylate, and the like.

When practicing the inventive method of use, a solid treating composition containing terbuthylazine is particularly and preferably added directly or indirectly to the recirculating water in a system in early spring when the growth of algae is seasonally and usually at its greatest rate averaged over a year and before the recirculated water of the system and internal surface portions of the system are in jeopardy of becoming fouled by algae. In this period, depending upon the experience with a given system, it may be desirable to achieve a higher concentration of terbuthylazine than is needed at or in other seasons of the year to achieve algae control, as those skilled in the art will appreciate. To achieve a higher concentration of terbuthylazine in the treating water of a system, an operator may, for a simple example, simply add an extra molded body that comprises a treating composition of the invention to a reservoir or well of a cooling tower in the system that already contains a single molded treating composition body with the aim of substantially temporarily increasing, perhaps even, for example, approximately doubling the concentration of terbuthylazine present in the system.

Preferably the inventive algae control process is practiced with a recirculating water system where there is good mixing potential and good contact potential between a treating composition and the recirculating water (or portion thereof), as, for example, in a cooling tower basin near the recirculating water pump, or near the fountain of a recirculating water pump or the like.

The present invention is believed to be, and is intended to be, consonant with US EPA rules regarding terbuthylazine application to cooling water systems and decorative fountains under which terbuthylazine is employed in a closed system that prevents terbuthylazine from contacting handlers or other persons and being discharged into waste water or the like.

EMBODIMENTS

The following Examples illustrate the invention.

EXAMPLE 1

Composition and Composition Preparation 67 parts by weight of polyethylene glycol having an average molecular weight of about 8000 and an average freezing point of about 140° F. available commercially from the Dow Chemical Company as E8000 is charged to a steam jacketed mixing kettle equipped with a ribbon mixer and is heated to about 200° F. until completely melted and fluid.

Then, 33 parts by weight of a terbuthylazine powder available commercially from BioLab under the trademark "Bellacid 320" that is believed to contain about 95 weight % terbuthylazine on a total powder basis is gradually added to the kettle and mixed with the polyethylene glycol until a uniform, homogeneous mixture is obtained. At a temperature of about 160° F., the resulting semi-liquid slurry-like mixture is poured into various molds. Upon cooling to ambient temperatures, the molded product is formed into a relatively hard solid composition in each mold that conforms to the shape of each associated mold. The molds are follows:

Mold #1 is an open, wide mouth gallon size plastic bottle such as illustrated in FIG. 1.

Figure 2:
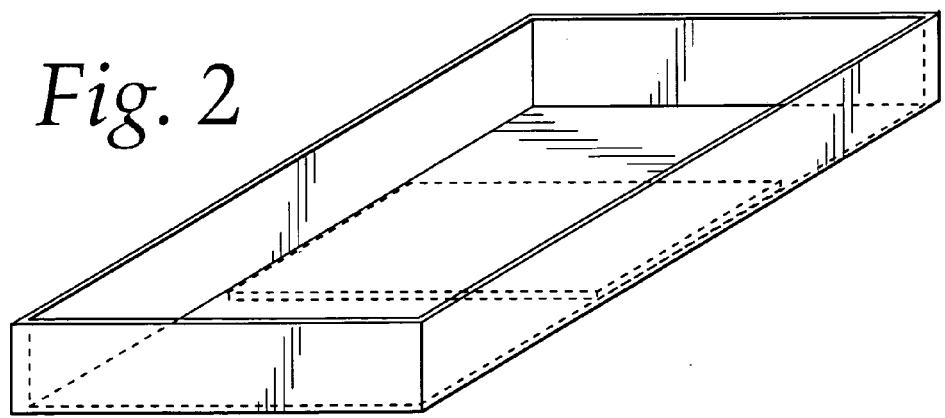

Mold #2 is a generally rectangular plastic tray such as illustrated in FIG. 2.

Figure 3:
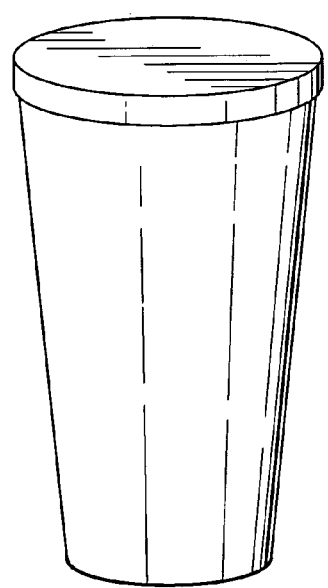

Mold #3 is a plastic container in the configuration of a conical section such as illustrated in FIG. 3.

Figure 4:
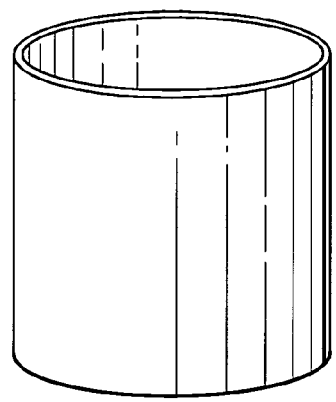

Mold #4 is an open mouth, cylindrical plastic tray such as illustrated in FIG. 4.

Mold #1 has a height of about 6.5 inches and a diameter of about 6 inches. Mold #2 has a height of about 1.75 inches, a width of about 4.5 inches, a length of about 5.5 inches and a weight, including both the mold and the composition therein, in the range of about 1 to 2 pounds. Mold #3 has a height of about 6.5 inches, a diameter at its base of about 2.5 inches, a diameter at its apex of about 3.75 inches, a volume of about 22 ounces and a weight, including both the mold and the composition therein, of about 1 to 2 pounds. Mold #4 has a height of about 1.75 inches and a diameter of about 2.5 inches.

The resulting solid treating composition that comprises each of these molded bodies contains on a 100 weight percent total weight basis about 32 weight percent terbuthylazine, about 67 weight percent polyethylene glycol, and about 1 weight percent inerts.

EXAMPLE 2

Dissolution of Composition in Water

The molded body comprised of the composition of Example 1 is separated from Mold #4 of Example 1 and is positioned at one end of a mid-region of a longitudinally extending, relatively short, horizontally oriented, flat-bottomed raceway about 4 inches in width which is inclined at an angle of about 30 degrees. Approximately 5 gallons of tap water at ambient temperature is slowly and uniformly discharged onto the upper end of the raceway, allowed to flow downwards over and across the width of the raceway, and to pass over and against portions of the molded body located adjacent to the raceway. At the lower end of the raceway beyond the molded body, the resulting tap water is collected in a vessel.

The molded body produced in Mold #4 is observed to slowly dissolve at an apparently uniform rate during the water flow over the raceway. After all of the tap water has been so collected, a portion of the molded body is observed to remain undissolved. The collected water is found to contain dissolved terbuthylazine. These results illustrate that a composition of the invention slowly dissolves in water and releases into the water terbuthylazine in accord with the teachings of the invention. The water so circulated can be recirculated, if desired, and the recirculated water after passing over the solid composition is found to contain a larger amount of dissolved terbuthylazine than the water which is circulated over the composition only once.

EXAMPLE 3

Decorative Fountain

The molded body produced in Mold #4 is believed to be suitable for inserting into the bottom water collection pond associated with a small decorative statue. An associated electrically operated pump that is provided recirculates the water at a relatively slow rate continuously from the bottom pond and releases the water over upper portions of the statue from where the water drains downwards and returns to the bottom pond for recirculation. Periodically, as the recirculated water gradually evaporates, make up water from a nearby tap may be manually added batchwise to the bottom pond. When the molded body produced by Mold #4 is placed in the bottom pond, it is observed that the water so recirculated, and the portions of the statue that are so contacted therewith, remain free from contamination by algae so that control of algae is effected.

EXAMPLE 4

Control of Algae in an Evaporative Condenser

The recirculating water of an evaporative condenser is treated with a solid composition of Example 1 using the composition as molded in Mold #2 of Example 1.

Figure 5:
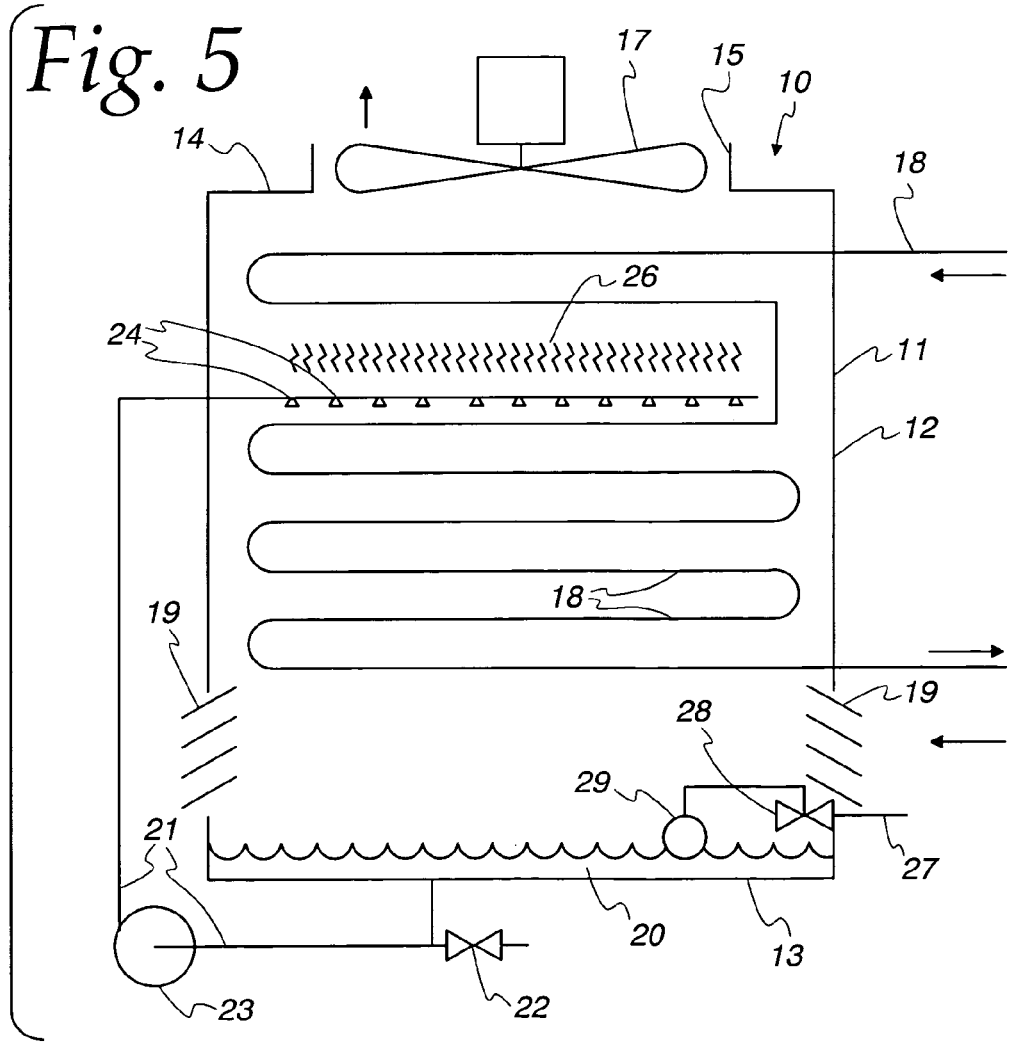

A diagrammatic illustration of a conventional type of evaporative condenser 10 is seen in FIG. 5. The condenser 10 has a housing 11 with cylindrical sides 12 and connected bottom plate 13 and top plate 14. The top plate 14 has a central vent 15 that is provided with an electrically driven exhaust fan 17. Lower portions of the sides 12 are provided with louvered vents 19. As the fan 17 operates, air is drawn into housing 11 through vents 19, moves upwardly, and exhausts through vent 15.

Discharge gas (that is, a coolant or refrigerant, such as an environmentally acceptable "Freon"-type chlorofluorocarbon in a gas phase, not shown) from a compressor (such as, for example, an air conditioning compressor, not detailed) is conveyed through a tube 18 and enters into an upper portion of the housing 11. The tube 18 in housing 11 is arranged in a coiled or convoluted pattern within housing 11 to provide a relatively large tube surface area. In the upper portion of the housing 11 the tube 18 preferably arranged in a distinct pattern that is apart from another distinct pattern in the lower mid-region of the housing 11.

In operation of the evaporative condenser 10, the discharge gas entering into the upper portion of housing 11 through the tube 18 may be in a condition known to the refrigeration/air-conditioning art as a superheated state, but, as described below, when the discharge gas exits this upper portion through the tube 18, the discharge gas in tube 18 has been cooled below the superheated state. From the upper portion of the housing 11, sometimes termed the desuperheating section, the tube 18 enters the mid-region of the housing 11 where, as the discharge gas continues to flow through the tube 18, the discharge gas is gradually further cooled and condensed to a liquid (that is, a liquid refrigerant). The liquid refrigerant is conveyed from the housing 11 through the tube 18 and returned to the compressor for reuse.

The bottom internal region of the housing 11 over the bottom plate 13 and below the vents 19 provides a holding or reservoir tank 20 that is charged with water to a predetermined, relatively shallow depth. During operation of the evaporative condenser 10, water is continuously drawn off from bottom of the tank 20 through a pipe 21 that is provided with a valve 22 that may be remotely controlled (if desired, not detailed) and that is also provided with an electrically operated pump 23. The pipe 21 extends upwards and joins a plurality of spray heads 24 located generally transversely across the interior of the housing 11 at an upper mid-region thereof. Water from tank 20 is pumped by pump 23 through pipe 21 to spray heads 24 from which the water is discharged. The water so discharged is in generally finely divided form and travels downwards countercurrently relatively to the upward flow of air moving through the housing 11. Some of the water is evaporated and cooling occurs. The contact of surfaces of tube 18 by the moving of thus cooled air and water thereover cools and liquifies the refrigerant in tube 18, as desired. The discharged water that remains is collected back into the tank 20, as desired.

As those skilled in the art will appreciate, the recirculated water in the tank 20 is of a lower quality than normally associated with supplied water since the recycled water usually has for example, a higher mud and silt content, compared to tap water that may be charged thereto as make-up water.

Water vapor and air moving upward through and beyond the spray heads 24 passes through a condensing zone or eliminator 26, such as a plurality of transversely spaced, adjacent corrugated aluminum strips or the like (not detailed but conventional). In the eliminator 26, water vapor in the upwardly moving air is largely condensed into water which then drains downwards and mixes with the water from the spray heads 24. The residual air exiting upwardly from the eliminator 26 contacts the tube 18 in the upper desuperheating section of the evaporative condenser 10, thereby lowering the temperature of the gas in tube 18 below the superheating temperature, as desired.

Some water is gradually lost through evaporation from the tank 20 during condenser 10 operation. Water in the tank 20 is continuously supplied with make-up water to maintain the water in the tank 20 at a desired level. Thus, the tank 20 is associated with a water supply pipe 27 that is associated with a flow control valve 28 which is automatically controlled by the combination of a tank 20 level sensor (not detailed) which provides output signals to an associated a set-point controller 29 whose output regulates operational aperture of the valve 28.

When one or two embodiments of the composition of Example 1 in a Mold #4 are introduced into the tank 20 through a vent 19 (which is preferably fitted with an access door, not detailed, as those skilled in the art will readily appreciate), it is found that algae control (including avoidance of contamination of tank water and of all interior water-contacted surfaces by algae) of the evaporative condenser 10 is achieved, as desired.

EXAMPLE 5

Control of Algae in a Cooling Tower

The mold above identified in Example 1 as Mold #1 is associated with a wall mounted bowl that is incorporated into an automatic make-up water feed system used in a cooling tower.

In system operation, water is sprayed into the bowl holding the molded treating composition resulting in the surface dissolution of the treating composition and release of dissolved terbuthylazine into a reservoir. The reservoir is equipped with a float valve. When released by the float valve, the solution in the reservoir flows into and is admixed with the recirculating water in the cooling tower.

Control of algae in the cooling tower is achieved.

EXAMPLE 6

Control of Algae in a Cooling Tower

The mold above identified in Example 1 as Mold #2 is placed in the bottom of the recirculating water collecting of a cooling tower.

The mold is associated with a magnetic strip associated with a magnetic strip located on the back of the mold which enables the mold to be mounted on a side or bottom wall (as desired) of the cooling tower.

As the recirculating cooling water flows downwardly over the wall portions of the cooling tower, the solid treating composition is slowly dissolved, thereby releasing terbuthylazine into the recirculating water.

Control of algae in the cooling tower is achieved.

EXAMPLE 7

Control of Algae in a Cooling Tower

The solid composition formed in the mold above identified in Example 1 as Mold #3 is separated from the mold and is placed in an upright orientation in the bottom of a water-holding sump of a cooling tower. The solid composition is adapted for use as a "shock treatment" for treating a developed infestation of algae in recirculated water.

Surface portions of the composition slowly dissolve and release terbuthylazine into the recirculating water.

Control of algae in the cooling tower is achieved.

From the foregoing teachings and Examples, other and further compositions and methods relating to the practice of the invention will be suggested to those skilled in the art. Reasonable extensions and variations will be apparent to those skilled in the art and are within the teachings and scope of the present invention.

What is claimed is:

1. A molded, solid, water-soluble composition for contact with water being recirculated to control algae in said water, said composition comprising on a 100 weight percent total weight basis:

(a) from about 1 to about 55 weight percent of terbuthylazine, and (b) from about 45 to about 99 weight percent of water-soluble polyethylene glycol polymer that is a solid under ambient conditions and that melts at a temperature above about 100° F., said terbuthylazine being dispersed in said polyethylene glycol polymer when melted followed by molding and solidifying of the resulting dispersion in at least one mold whereby, when a surface portion of said so molded and solidified composition is contacted with water, said terbuthylazine is gradually delivered into said water by surface dissolution of said composition.

2. The composition of claim 1 wherein said polyethylene glycol polymer has a melting temperature in the range of from about 100° to about 200° F. and an average molecular weight in the range of from about 1,450 to about 10,000.

3. The composition of claim 1 wherein the amount of said terbuthylazine ranges from about 10 to about 40 weight percent and correspondingly the amount of said polyethylene glycol polymer ranges from about 60 to about 90 weight on said 100 weight percent basis.

4. The composition of claim 3 wherein said polyethylene glycol has an average molecular weight of about 8,000 and a melting temperature of about 140° F.

5. An article for controlling algae in water comprising the composition of claim 1 molded and solidified in a plastic bottle having a wide mouth.

6. An article for controlling algae in water comprising the composition of claim 1 molded and solidified in a tray.

7. An article for controlling algae in water comprising the composition of claim 1 molded and solidified in a conical section configuration.

8. An article for controlling algae in water comprising the composition of claim 1 molded and solidified in a cylindrical configuration.

9. A process for controlling algae in water comprising the steps of contacting at least a portion of said water with a composition of claim 1 and thereby progressively dissolving at least a surface portion of said composition in said water whereby said terbuthylazine is resultingly and progressively delivered into said water.

10. A process for controlling algae in recirculated water comprising the steps of:

(a) contacting at least a surface portion of a molded, solid treating composition with water, said treating composition comprising on a 100 weight percent total weight basis (1) from about 1 to about 55 weight percent of terbuthylazine, and (2) from about 45 to about 99 weight percent of solid, water soluble polyethylene glycol that is solid under ambient conditions and that melts at a temperature above about 100° F. wherein said terbuthylazine is dispersed; and said treating composition having been prepared by the steps of:

(1) melting said polyethylene glycol, (2) admixing with said melted polyethylene glycol said terbuthylazine until a uniform liquid mixture is obtained, (3) transferring said mixture to at least one mold, and (4) cooling said so molded mixture to form a molded solid; and (b) admixing the resulting so contacted water with said recirculated water whereby said surface portion is progressively dissolved and the concentration of said terbuthylazine in said recirculated water becomes at least sufficient to control algae.

11. The process of claim 10 wherein said composition comprises from about 10 to about 40 weight percent terbuthylazine and from about 60 to about 90 weight percent polyethylene glycol on said 100 weight percent basis.

12. The process of claim 10 where, in said composition, said polyethylene glycol has a solidification temperature in the range of from about 100° to about 200° F. and an average molecular weight in the range of from about 1,450 to about 10,000.

13. The process of claim 12 wherein said polyethylene glycol has an average molecular weight of about 8,000 and a solidification temperature of about 140° F.

14. The process of claim 10 wherein said terbuthylazine is preliminarily dispersed in said polyethylene glycol by the steps of initially melting said polyethylene glycol, and then dispersing said terbuthylazine in said melted polyethylene glycol to produce a generally uniform mixture, and thereafter said mixture is molded into at least one predetermined shaped body and cooled to solidify said at least one predetermined shaped body.

15. The process of claim 14 wherein said polyethylene glycol has an average molecular weight of about 8,000 and a solidification temperature of about 140° F.

16. The process of claim 15 wherein said water comprises recirculated water.

17. The process of claim 16 wherein said recirculated water is located in apparatus selected from the group consisting of an evaporative condenser, a heat-exchanger and a cooling tower.

18. The process of claim 10 wherein during said contacting at least a portion of said water is sprayed against at least a portion of said composition, and said resulting water is admixed with said recirculated water.

19. The process of claim 10 wherein during said contacting said water flows over exposed surface portions of said composition.

20. The process of claim 10 wherein during said contacting said composition is located in a recirculated water collecting sump.

21. The process of claim 10 wherein during said contacting said composition is located near a recirculating water pump.

22. The process of claim 10 wherein said recirculated water comprises water in a cooling tower.

23. The process of claim 10 wherein the relationship between said composition, said water, said contacting, and said admixing is such that the concentration of said terbuthylazine in said recirculated water is maintained at a level in the range of about 1 to about 3 ppm.

24. The process of claim 10 wherein said water comprises make-up water for replacing a portion of said recirculated water which has been removed by evaporation during circulation thereof.

25. The process of claim 10 wherein said molded, solid treating composition is in a plastic bottle having an open wide mouth.

26. The process of claim 10 wherein said molded solid treating composition is in a tray.

27. The process of claim 10 wherein said molded solid treating composition has a conical section configuration.

28. The process of claim 10 wherein said molded solid treating composition has a cylindrical configuration.

29. A process for preparing a molded solid algicidal treating composition for contacting with water to be recirculated comprising the steps of:
   (a) melting a water soluble polyethylene glycol that is a solid under ambient conditions and that melts at a temperature above about 100° F.
   (b) admixing with said melted polyethylene glycol from about 1 to about 55 weight percent of terbuthylazine based on 100 weight percent of total resulting composition until a uniform liquid mixture is obtained,
   (c) transferring said mixture to at least one mold, and
   (d) cooling said so transferred mixture to form a molded solid.

30. The process of claim 29 wherein said polyethylene glycol melts at a temperature in the range from about 100° to about 200° F. and is substantially completely melted at such temperature.

31. The process of claim 30 wherein said uniform mixture has a temperature of about 160° F. when so transferred.

32. The process of claim 29 wherein said polyethylene glycol has an average molecular weight of about 8,000 and a melting temperature of about 140° F. and is initially heated to a temperature of at least about 200° F. to substantially completely melt said polyethylene glycol.

33. The process of claim 29 wherein terbuthylazine is initially in a powdered form.

34. The process of claim 29 wherein during said transferring said at least one mold includes a plastic bottle having a wide mouth.

35. The process of claim 29 wherein during said transferring said at least one mold includes a tray.

36. The process of claim 29 wherein during said transferring said at least one mold has a conical section configuration.

37. The process of claim 29 wherein during said transferring said at least one mold has a cylindrical configuration.

* * * * *